United States Patent
Demers et al.

(10) Patent No.: US 6,771,934 B2
(45) Date of Patent: Aug. 3, 2004

(54) METHODS AND SYSTEMS FOR REDUCING INTERFERENCE ACROSS COVERAGE CELLS

(75) Inventors: Stephanie Demers, Edison, NJ (US); Paul G. Zablocky, Shrewsbury, NJ (US); Shimon Moshavi, Bet Shemesh (IL)

(73) Assignee: Telcordia Technologies, Inc., Piscataway, NJ (US)

( * ) Notice: Subject to any disclaimer, the term of this patent is extended or adjusted under 35 U.S.C. 154(b) by 386 days.

(21) Appl. No.: 09/884,637

(22) Filed: Jun. 19, 2001

(65) Prior Publication Data

US 2003/0003906 A1 Jan. 2, 2003

(51) Int. Cl.[7] .................................................. H04B 1/00
(52) U.S. Cl. ................... 455/63.1; 455/67.13; 455/517; 375/148; 375/346
(58) Field of Search ............................... 455/63.1, 63.2, 455/67.11, 67.13, 423, 424, 426.1, 436, 437, 438, 439, 456.1, 517; 375/140, 141, 144, 147, 148, 346; 370/342, 335

(56) References Cited

U.S. PATENT DOCUMENTS

| | | | |
|---|---|---|---|
| 5,594,946 A | * | 1/1997 | Menich et al. ............. 455/63.1 |
| 5,862,124 A | * | 1/1999 | Hottinen et al. ........... 455/63.1 |
| 6,167,240 A | * | 12/2000 | Carlsson et al. ............ 455/501 |
| 6,486,831 B1 | * | 11/2002 | Martorana et al. .......... 342/458 |
| 6,516,196 B1 | * | 2/2003 | Chen et al. .................. 455/525 |

OTHER PUBLICATIONS

S. Moshavi, "Multi–User Detection for DS–CDMA Communications," IEEE Communications Magazine, Oct. 1996, vol. 34, No. 10, pp. 124–136.

* cited by examiner

*Primary Examiner*—Charles Appiah
*Assistant Examiner*—Rafael Perez-Gutierrez
(74) *Attorney, Agent, or Firm*—Joseph Giordano; James W. Falk (57) ABSTRACT

Methods and systems are provided for reducing interference across coverage cells using base stations interconnected by a packet network. A wireless device monitors the channel signal strength of its serving cell and its neighboring cell. The serving cell collects measurements from the wireless devices within its cell and informs its neighboring cell when one of the wireless device may be causing significant interference to the neighboring cell. The neighboring cell collects this information and executes a multi-user detection and cancellation algorithm on a subset of these interfering wireless devices.

12 Claims, 11 Drawing Sheets

METHODS AND SYSTEMS FOR REDUCING INTERFERENCE ACROSS COVERAGE CELLS

CROSS-REFERENCE TO RELATED APPLICATIONS

The application of Paul Zablocky and Shimon Moshavi entitled, "Methods and Systems for Adjusting Sectors Across Coverage Cells", Ser. No. 09/884,649, filed Jun. 19, 2001, now U.S. Pat. No. 6,708,036, Mar. 16, 2004, contains subject matter related to the subject matter of the present application, and is hereby incorporated in its entirety by reference.

BACKGROUND OF THE INVENTION

1. Field of Invention

The present invention relates generally to reducing interference in a wireless communication system, and more particularly, to methods and systems for reducing interference by canceling interfering radio signals transmitted from wireless devices in neighboring cells.

2. Description of the Prior Art

As wireless communications become more widely used, the demand for wireless resources, such as the available electromagnetic bandwidth, has become increasingly inadequate. One radio communication technique known as Code Division Multiple Access ("CDMA") has been introduced to alleviate some of these problems by allowing simultaneous transmission of multiple signals over a shared portion of the electromagnetic spectrum. This is accomplished by using a spread spectrum technique to assign a unique code to data and modulating the result onto a radio frequency carrier signal. A receiver then detects the radio signal and recovers the data by demodulating the radio signal using that unique spreading code. As a result of the spread spectrum technique, the receiver is able to generate a gain in the power of the detected signal with respect to noise and other signals. Accordingly, signals from a number of transmitters may be contemporaneously transmitted using different spreading codes over the same bandwidth.

Theoretically, if the unique spreading codes were perfectly orthogonal, bandwidth capacity would only be limited by the processing power available at the receiver and the length of the codes. In reality, however, it is unfeasible to design these unique codes to be perfectly orthogonal given the random time offset between signals. Accordingly, interference between contemporaneous signals called multiple access interference ("MAI") results and impacts the capacity and performance of conventional CDMA systems. Although the MAI caused by a single signal is usually small, the amount of MAI becomes substantial as the number of signals increase.

In addition, the amount of MAI can be further exacerbated by high data rate communications. In some CDMA systems, a high data rate communication can be divided into multiple data channels, which prevents too low a spreading factor. In such a situation, each data channel uses a different code and consequently each high data rate communication uses multiple codes. Accordingly, high data rate communications can create artificial hot spots, i.e., one high data rate communication is equivalent to several lower data rate communications all bundled together. For this reason, the MAI impact of a high data rate communication can be more significant than the MAI impact of a lower data rate communication. Similarly, signals originating near the edge of a coverage cell can also exacerbate MAI due to the increased power needed to transmit those signals from the edge of the coverage cell.

Several methods have been used in conventional CDMA detectors to mitigate the effect of MAI. For example, power control has been used to mitigate the near-far effect problem such that all signals, irrespective of distance, arrive at the base station with the minimum power required. The minimum power required for high data rate signals, however, may still be sufficiently great to drown out or severely interfere with other signals. Moreover, limiting the transmit power will generally result in an unwanted consequence of smaller cell sizes.

Another attempt to reduce MAI in wireless communication systems involves subtracting interfering signals from the received signal. Two well-known subtractive interference cancellation detectors are the successive interference cancellation ("SIC") detector and parallel interference cancellation ("PIC") detector. The SIC detector takes a serial approach to canceling interference. Each stage of this detector makes a bit decision, regenerates, and cancels out one additional signal from the received signal, so that the remaining signals detect less MAI in the next stage. In contrast to the SIC detector, the PIC detector estimates and subtracts out all of the MAI for each signal in parallel. Further information on SIC and PIC detectors may be found in Multi-User Detection for DS-CDMA Communications, S. Moshavi, IEEE Communications Magazine, October 1996, Vol 34, No. 10., herein incorporated by reference.

Prior art cancellation techniques, however, suffer from at least two disadvantages. First, only the signals that are known to the receiving cell are capable of being subtracted. This is because the receiver needs the desired signal's unique code to demodulate and subtract it from the total received signal. In conventional CDMA systems, those signals are limited to signals from wireless devices within the cell and signals from wireless devices undergoing soft-handoff. Accordingly, interfering signals that are not in soft-handoff or originating within the serving cell are neglected.

In addition, prior art cancellation techniques fail to determine which signal(s) should be subtracted to improve signal reconstruction of the remaining signal(s). Making such a determination is valuable since the processing power required to demodulate and subtract interfering signals is usually limited. The prior art also fails to subtract strategic signals, such as high data rate signals, to significantly reduce MAI.

SUMMARY OF THE INVENTION

Accordingly, methods and systems are provided to overcome the above and other problems of the prior art.

Methods and systems consistent with the present invention, as embodied and broadly described herein, reduce interference in a wireless communication system. In one embodiment of the present invention, a first wireless device, being served by a first cell, performs measurements and transmits the measurements to the first cell. Upon receiving the measurements, the first cell determines whether the first wireless device may be causing interference at a second cell and then transmits interference information to a second cell if it is determined that the first wireless device is causing interference at the second cell. Upon receiving the interference information from the first cell, the second cell demodulates and cancels the first wireless device based on the interference information.

In another embodiment, interference between wireless devices is canceled within a plurality of cells serving the wireless devices. The signal strengths of the cells are monitored by the wireless devices and information from the wireless devices is collected at the serving cells. Based on that information, it is determined that one or more of the wireless devices causes interference in one or more of the cells neighboring the serving cells that serve the one or more interfering wireless device. The information about the interference is then transmitted to the neighboring cells to cancel the interference, if the neighboring cells so choose.

It is to be understood that both the foregoing general description and the following detailed description are exemplary and explanatory only and are not restrictive of the invention, as claimed. Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims. The accompanying drawings, which are incorporated in and constitute a part of this specification, illustrate several embodiments of the invention and together with the description serve to explain the principles of the invention.

DETAILED DESCRIPTION OF EMBODIMENTS OF THE INVENTION

The present invention is directed toward systems and methods for sharing information between base stations to reduce interference within a wireless communication coverage cell. By sharing information between base stations, interfering communication signals may be detected and demodulated to cancel the interfering communications.

Those skilled in the art appreciate that only a small portion of neighboring-cell communications need to be canceled to obtain significant reduction of MAI. More particularly, by carefully selecting the highest MAI-producing communications, significant reduction in neighboring-cell interference can be made while keeping the processing power requirement to its minimum. By canceling the worst neighboring-cell's interfering communications, performance gains such as increased capacity, better reliability, wider coverage, higher data rates, and improved power utilization, may be achieved. In addition, reducing the interference impact of high data rate communications will allow service providers to offer uniform coverage throughout the cell.

Reference will now be made in detail to the preferred embodiments of the invention, examples of which are illustrated in the accompanying drawings. Wherever possible, the same reference numbers will be used throughout the drawings to refer to the same or like parts.

Figure 1:
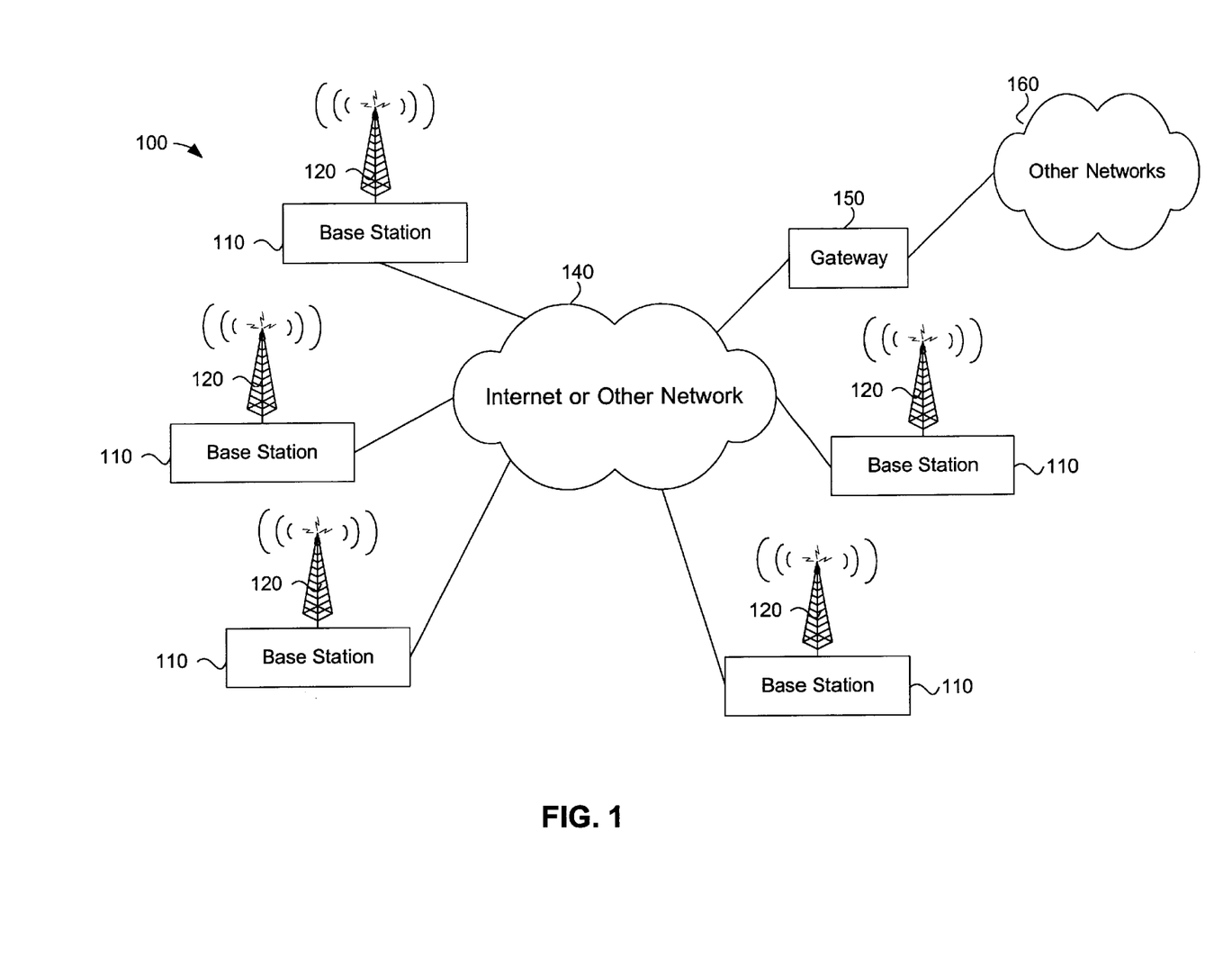
FIG. 1 illustrates a wireless system, in accordance with methods and systems consistent with the invention.

FIG. 1 illustrates a block diagram of a wireless system 100, in accordance with methods and systems consistent with the invention. As illustrated, one of more base stations 110 are connected to a network 140, which may include, for example, the internet of any other type of network. The base stations 110 may be directly connected to network 140 or may be connected to network 140 through subnetworks (not shown). Other networks 160 may be connected to network 140 through a gateway 150.

As illustrated, each base station 110 is connected to an antenna 120 through which communication is established with wireless devices. Like present cellular systems, each base station 110 communicates with wireless devices located in a particular cell where each cell covers a specific geographical area. The wireless devices (not shown) used to communicate in cellular wireless system 100 may include, for example, a standard wireless phone, a third generation cellular device, or any other type of wireless device.

In cellular wireless system 100, the intelligence that in the prior system resided in the base transceiver systems ("BTS"), base station controllers ("BSC"), and mobile switching centers ("MSC") may be distributed amongst the base stations 110.

For example, each base station 110 may operate autonomously and include intelligence for exchanging information with other base stations for the purposes of adjusting the coverage areas for the base stations, handing off wireless devices from one base station to another, and, when the base station 110 is plugged into the network 140, automatically locating other base stations and configuring itself. Further, each base station 110 may be configured using software programmable on a MultiPC platform. That is, the base stations 110 may not need specific hardware, but rather, all of the base station's functionality may be performed in software using general purpose processors.

Because there is no central MSC or BSC, the wireless system can be grown simply by adding base stations 110 to the wireless system. As such, this solution may be used for both very small and very large configurations. Also, the base stations 110 may use advanced signal processing, such as space time adaptive processing ("STAP"), multi-user detection ("MUD"), and multi-user detection across cells ("MUDAC"). Further, the base stations 110 may use sectored antennas that adapt their direction dynamically to improve network performance.

The base stations 110 may also use standard internet protocols for communicating over the network 140. For example, the base stations may use Mobile IP, DHCP, VPN, etc. to communicate with each other. Also, the base stations may use standard air interfaces, such as, IS-95, cdma2000, UWC-136, W-CDMA, UMTS-3GPP-W-CDMA, etc. Further, because standard air interfaces may be used, no changes to existing cellular phones or networks are necessary.

Figure 2:
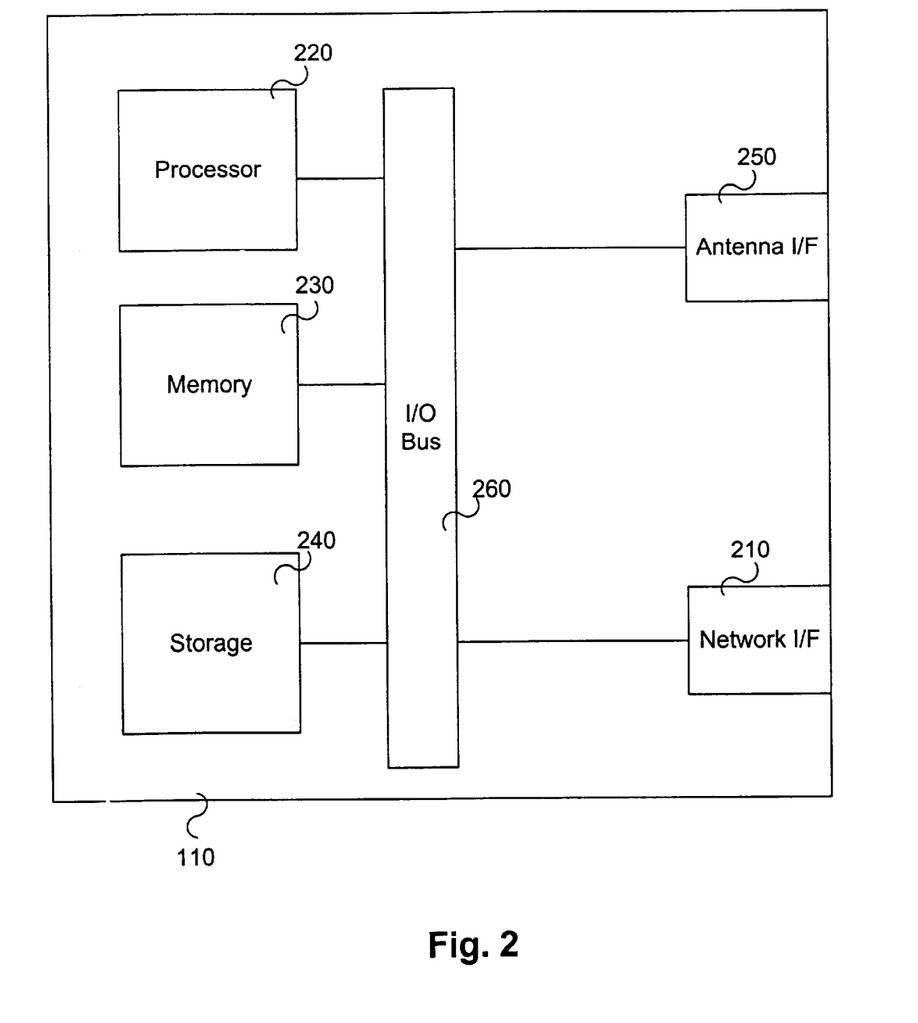
FIG. 2 illustrates a block diagram of a base station, in accordance with methods and systems consistent with the invention.

FIG. 2 illustrates a block diagram of a base station 110, in accordance with methods and systems consistent with the invention. As shown, the base station 110 includes a network interface 210, a processor 220, a memory 230, a storage device 240, an antenna interface 250, and a bus 260. The network interface 210 is preferably an Ethernet type interface that the base station 110 uses to connect to the network 140. The processor 220 may be any type of processor for performing computer type operations. The memory 230 may be any type of memory, such as a Random Access Memory ("RAM"). The storage device 240 may be any type of storage device, such as, a hard drive, a CD-ROM, etc. The antenna interface 250 connects the base station to an antenna for communicating with wireless devices. The antenna interface 250 may include a radio transmitting and receiving device (not shown).

As discussed above, each base station may be a plug and play type device. For example, when a base station 110 connects to a network such as network 140, it automatically identifies any other base stations 110 also connected to the network. Then, the base stations 110 communicate with one another to automatically determine the coverage area for the new base station and the existing base stations in the network. Then, the base stations may communicate amongst themselves to accomplish various functions, such as handing off wireless devices from one base station to another.

Figure 3:
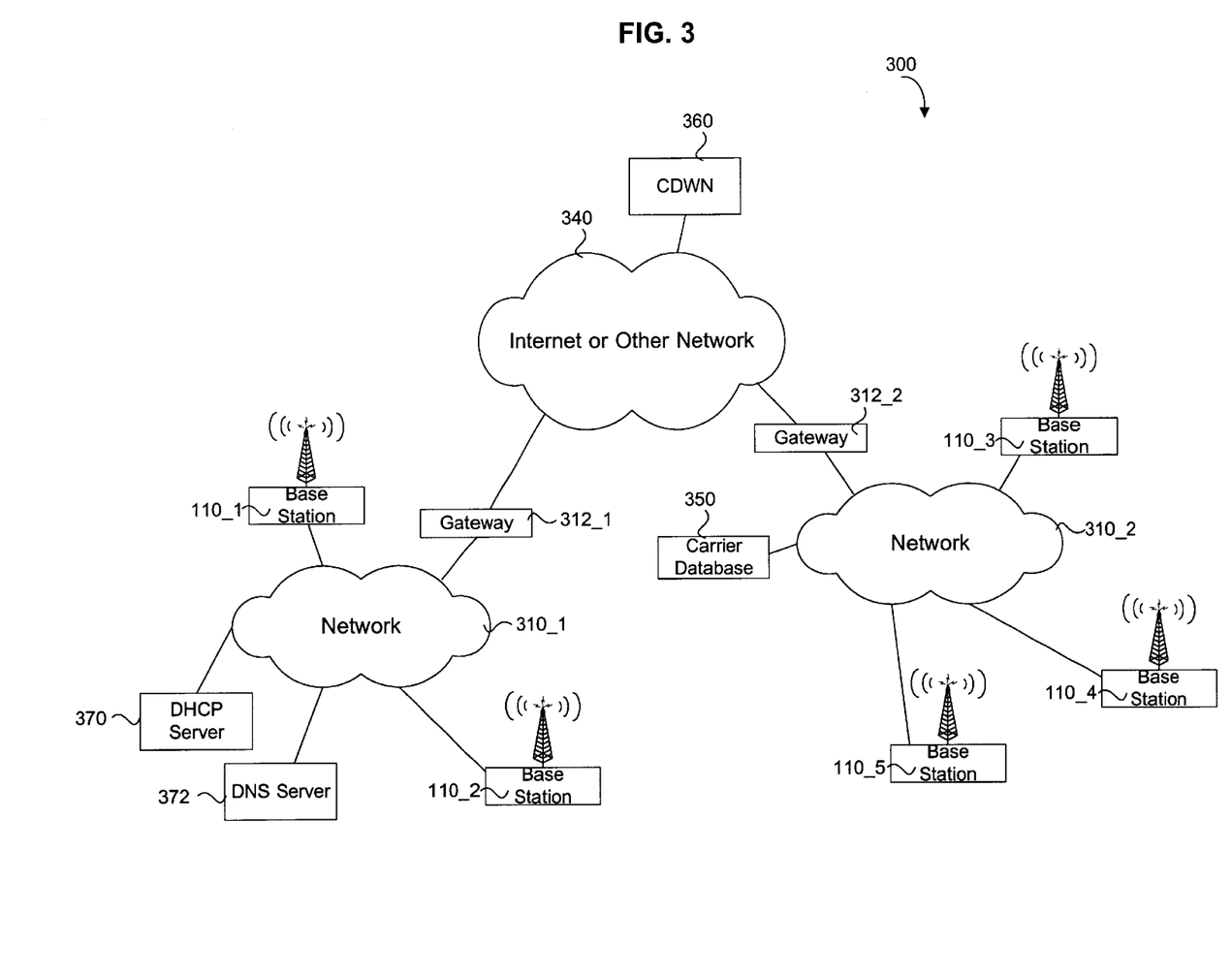
FIG. 3 illustrates a wireless system, in accordance with methods and systems consistent with the invention.

FIG. 3 illustrates a wireless system 300, in accordance with methods and systems consistent with the invention. As illustrated, base stations 110_1 and 110_2 are connected to network 310_1, which is connected to a network 340 through gateway 312_1. Network 310_1 may include a Dynamic Host Control Protocol ("DHCP") server 370 and a Domain Name Server ("DNS") 372.

Base stations 110_3, 110_4, and 110_5 are connected to a network 310_2, which connects to network 340 through gateway 312_2. A carrier database 350, which connects to network 310_2, stores information regarding the base stations in a carrier's network. For example, the carrier database 350 may store the IP address for each of the base stations in the carrier's network. A carrier refers to a company providing wireless services.

Networks 310_1 and 310_2 may include any type of network, such as, an Ethernet, a Fiber Distributed Date Interface ("FDDI") network, etc. Network 340 may also include any type of network, such as the Internet.

The central database of wireless networks ("CDWN") 360 stores information regarding the network addresses (e.g., IP addresses) for the carrier databases 350. For example, there may be multiple carriers providing wireless services, such as Bell Atlantic, Sprint, etc. In such an embodiment, the CDWN 360 may store the network address of the carrier database 350 for each carrier. Thus, if a base station needs to locate a carrier database 350 of a particular carrier, it can access the CDWN 360 to obtain the network address for the carrier database 350.

With the above preface on the illustrative operating environment, the remaining FIGS. 4–9, which illustrate aspects of the preferred embodiments of the present invention, will be described next.

Figure 4:
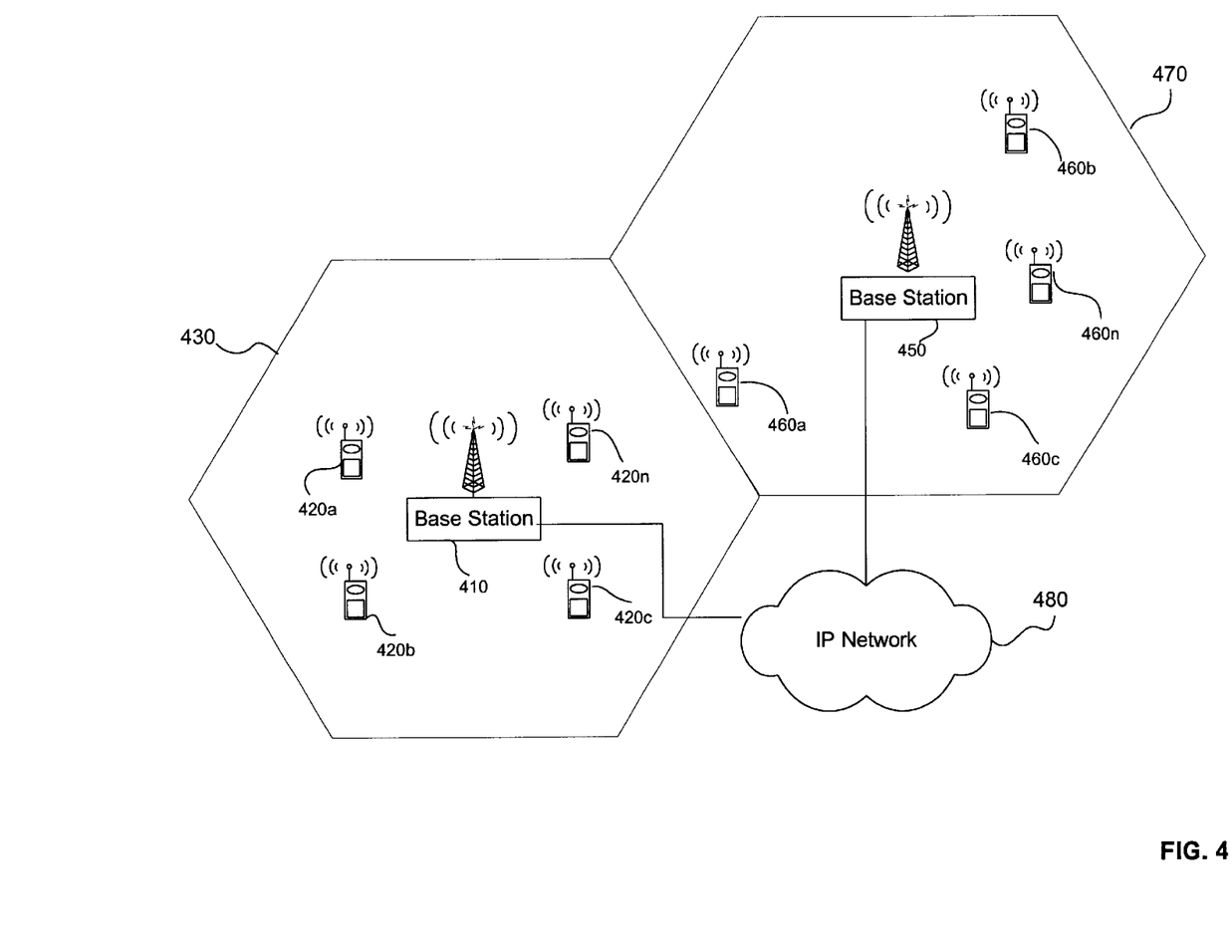
FIG. 4 illustrates two exemplary base stations in a wireless communications system operating in accordance with methods and systems consistent with the present invention.

FIG. 4 illustrates two exemplary base stations 410 and 450 connected by a network 480 in a wireless communications system operating in accordance with methods and systems consistent with the present invention. While the two exemplary base stations 410 and 450 are shown to be interconnected via packet network 480, any network with sufficiently high data speed and sufficiently low delay could be used to connect the base stations. As described above, in one embodiment of the present invention, the packet network 480 may include the global computer network commonly referred to as the "Internet." The packet network 480 may use protocols well known to those skilled in the art, such as Mobile IP.

Base stations 410 and 450 are also shown serving a plurality of wireless devices, 420a, 420b, 420c, . . . , 420n and 460a, 460b, 460c, . . . , 460n, respectively. Wireless devices typically have a limited range and communicate within respective coverage cells of a wireless communication system. Within such a system, a handoff occurs when a wireless device moves out of range of its existing base station contact within a given cell. Instead of allowing the call connection signal to deteriorate to noise level, the call connection is transferred or handed-over to another cell to maintain the communication with the roving wireless device.

The coverage areas of base stations 410 and 450 are shown as hexagonal cells 430 and 470, which serve to indicate an approximate boundary within which radio communications can be effected with their respective wireless devices 420 and 460. Data is communicated between wireless devices operating within its radio coverage area and their respective base stations by transmitting and receiving radio signals.

In this embodiment, the wireless devices communicate with their respective base stations via antennas in accordance with Wide-Band Code Division Multiple Access ("W-CDMA"). A detailed explanation of how data is communicated using W-CDMA is provided in the 3GPP standards:

| | |
|---|---|
| Physical Layer: | 3GPP TS 25-200 Series (Release 1999) |
| UE-UTRAN radio interface: | 3GPP TS 25-300 Series (Release 1999) |
| UTRAN Iu, Iur, Iub interfaces: | 3GPP TS 25-400 series (Release 1999) | the contents of which are incorporated herein by reference in their entireties. While several embodiments of the present invention will be generally described in the context of a W-CDMA wireless communication system, other communication schemes or techniques, such as spread spectrum CDMA, may be used instead.

Each base station 410 and 450 includes an antenna array comprising at least one antenna capable of receiving a plurality of communications from a plurality of wireless devices. Because each wireless device is individually located within a cell, a plurality of transmission paths exists between the antennas and the wireless devices. Each transmission path, in turn, has a corresponding path delay and signal strength relative to its receiving antenna. For example, wireless device 460a, shown located near the outer edge of coverage cell 470, has a longer transmission path and typically a higher transmit-power level than wireless device 460b, which is located closer to base station 450. As described in the background section, wireless devices transmitting at increased power levels can cause significant interference. This is because the increased power, while necessary for the wireless device to effectively transmit to its serving base station, may be so strong that the signal also effectively reaches a neighboring base station, thereby causing interference. Assuming the neighboring base station is not demodulating the interfering signal, i.e., undergoing soft-handoff, the neighboring base station has no way of canceling the interference. In this embodiment, such interference, as well as interference caused by any other wireless devices, such as high data-rate devices, is reduced by exchanging information about the wireless devices between base stations. The exchanged information may then be used to demodulate and cancel interfering signals across cells.

Canceling the signals of interfering devices, such as high transmit-power and high data-rate devices, not only reduces interference but also reduces the necessary transmit-power and increases the capacity available in the neighboring cell. In addition, it allows high data-rate devices, which may previously have been restricted to a small region around the base station, to have broader access within their serving cell.

Figure 5:
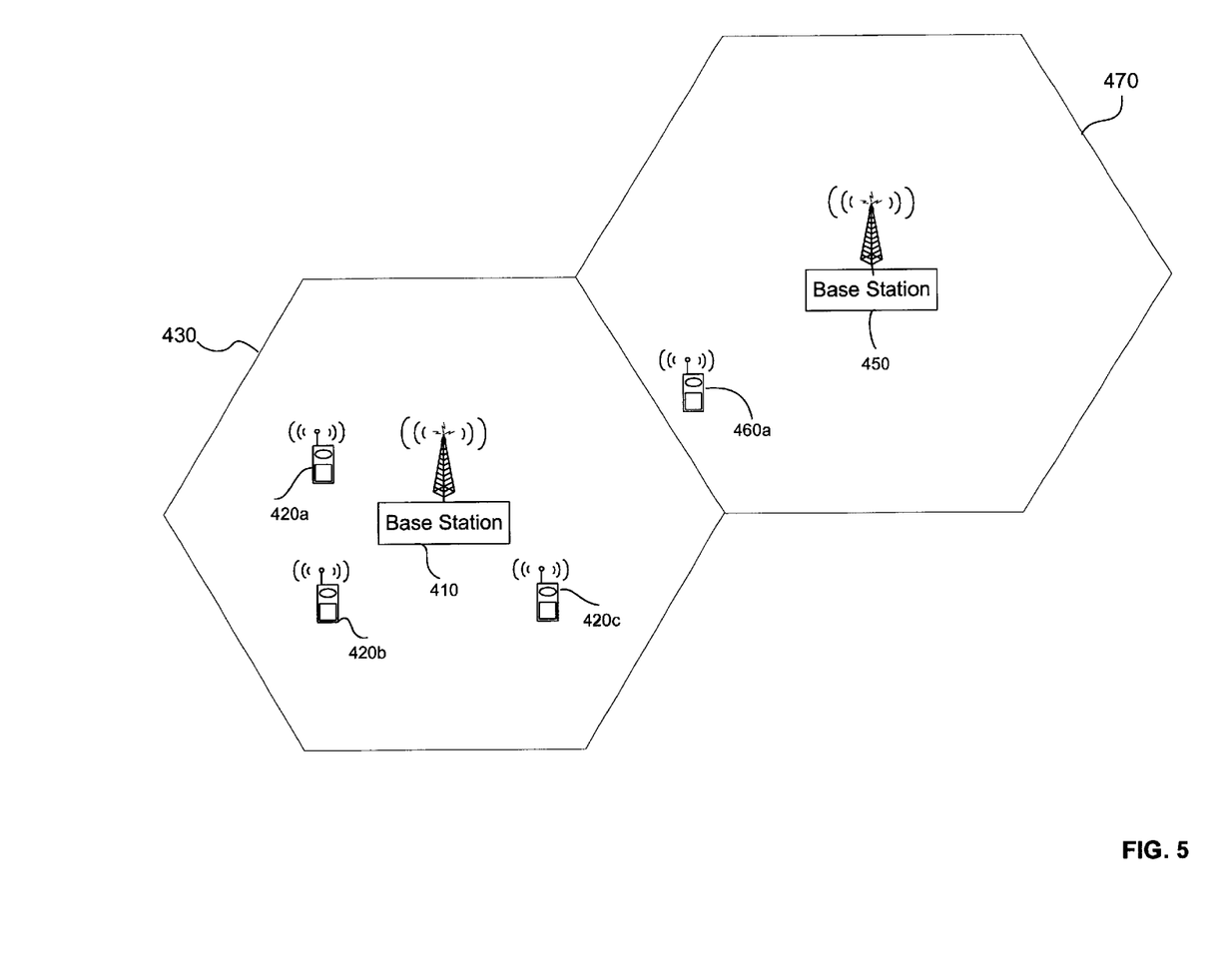
FIGS. 5–8 illustrate a system process diagram for reducing interference across coverage cells in accordance with methods and systems consistent with the present invention.

Referring now to FIGS. 5 through 8, a system process diagram for reducing interference across coverage cells will be described in accordance with an embodiment of the present invention. In FIG. 5, wireless device 460*a* is shown within coverage cell 470 served by base station 450. Wireless device 460*a* is also shown transmitting at a power level sufficient to cause interference at neighboring base station 410. For example, wireless device 460*a* may be transmitting at a high data-rate or located near the edge of its coverage cell. With respect to a particular wireless device, the term "neighboring cell" or "neighboring base station" as used herein means any base station that does not currently serve that wireless device.

In accordance with one embodiment, wireless devices, such as wireless device 460*a*, perform downlink channel measurements on both their serving base stations and their neighboring base stations. For example, wireless device 460*a* may perform signal strength measurements on each of its neighboring base stations. In another embodiment of the invention, wireless device 460*a* may perform signal-to-noise ratio measurements on each neighboring base station or a combination of both signal strength and signal-to-noise ratio measurements on each neighboring base station. The methods and systems for taking signal strength measurements are well known to anyone skilled in the art of wireless technology. Likewise, the methods of making signal-to-noise ratio measurements are well known to anyone skilled in the art of CDMA wireless technology.

Figure 6:
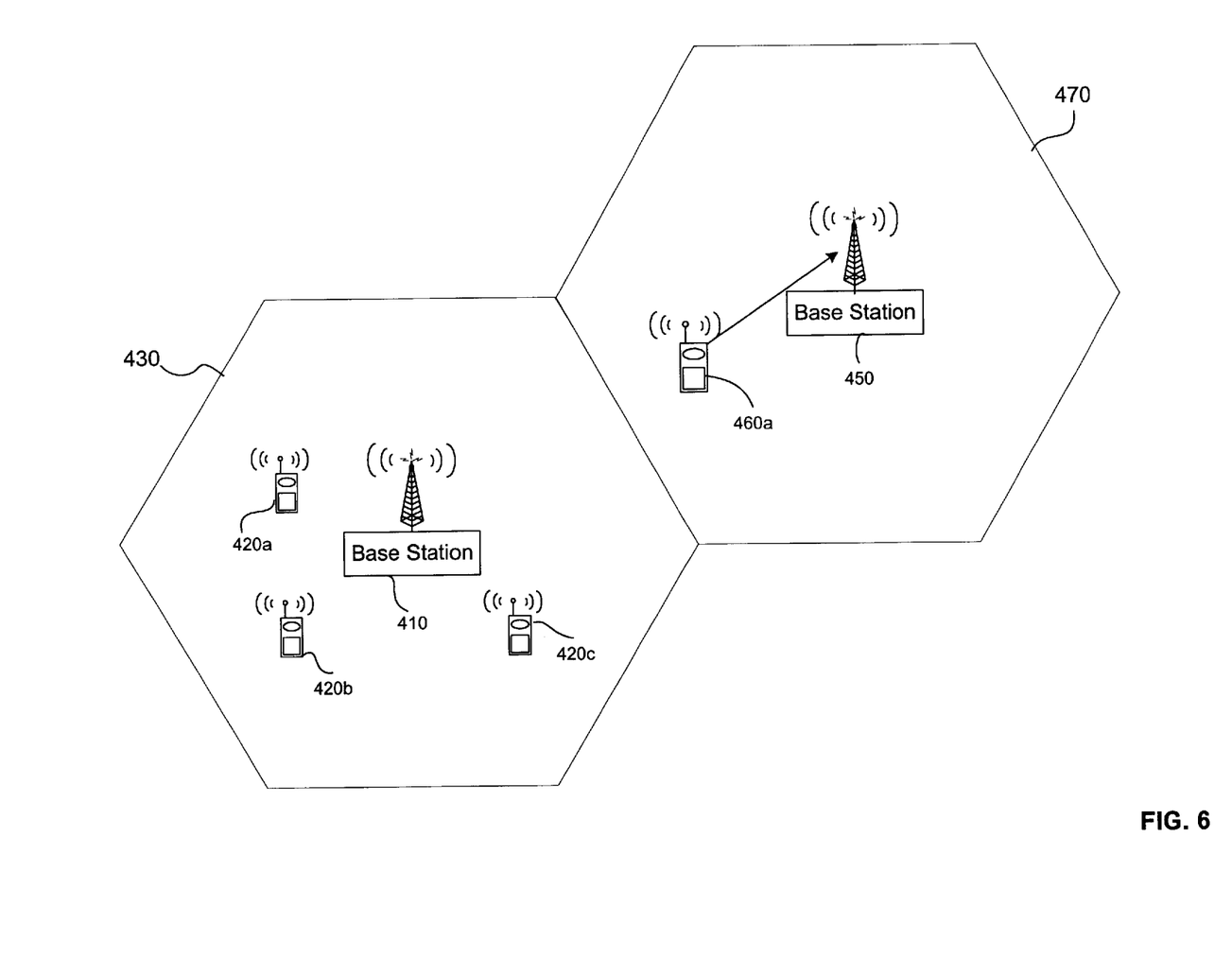

Referring now to FIG. 6, the results of these measurements are communicated to the serving base station 450 by data messages sent from wireless device 460*a* to base station 450. In accordance with one embodiment, wireless devices may transmit measurement messages when requested by their serving base station. In another embodiment, the serving base station may specify transmission of measurement information based on particular measurement reporting criteria. For example, the measurement reporting criteria may specify periodic reporting, event triggered reporting—such as when a neighboring base station signal strength measurement exceeds a predetermined threshold, or a combination of both periodic and event triggered reporting. Wireless devices may perform intra-frequency and/or inter-frequency measurements depending on the frequency of the neighboring cells as compared to the serving cell. For example, if all neighboring cells were at the same frequency as the serving cell, a wireless device would only perform intra-frequency measurements. Four event-triggered measurements, events 1*e*, 2*e*, 6*a*, and 6*b*, as well as one periodic internal measurement report, UE transmit power, are initially defined directly from 3GPP W-CDMA standards so as to provide simple integration with the W-CDMA system. For events 1*e* and 2*e*, the wireless device reports pilot measurements when the pilot becomes stronger than an absolute threshold. Event 1*e* is for intra-frequency measurements and event 2*e* is for inter-frequency measurements. For events 6*a* and 6*b*, the wireless device repeats its transmit power measurements when the wireless device power becomes larger or smaller than an absolute threshold.

On receipt of the measurement information, base station 450 evaluates the information to determine whether wireless device 460*a* may be causing interference at a neighboring base station, such as base station 410. For example, wireless device 460*a* may be considered potentially interfering to a particular neighboring base station when its measurement of the base station's signal exceeds a predetermined threshold, which may depend, among other things, on the wireless device data rate and location.

Figure 7:
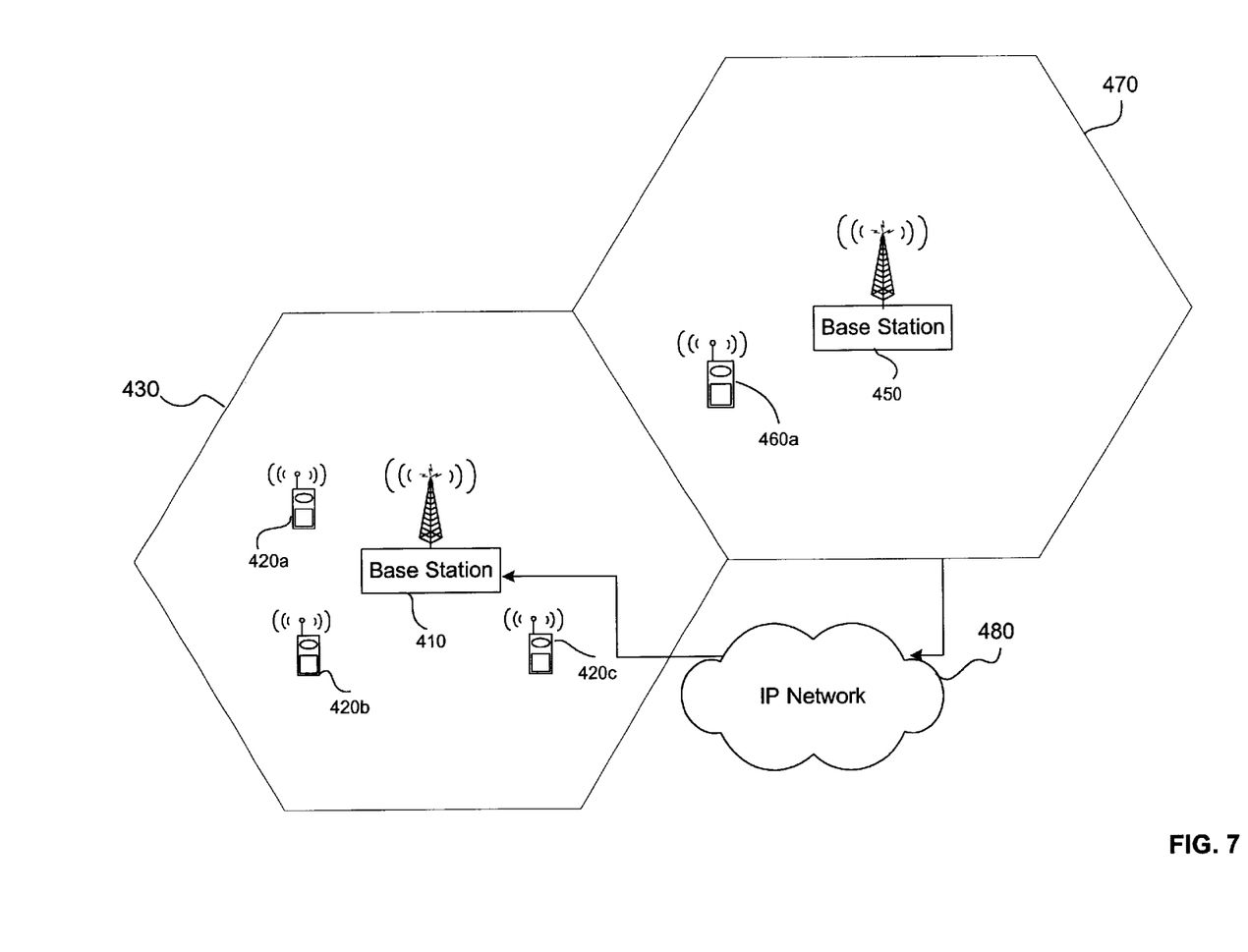

Referring now to FIG. 7, upon determining wireless device 460*a* may be causing interference at neighboring base station 410, base station 450 transmits an interference report to base station 410 via network 480. The interference report may include the following information for wireless device 460*a*: 1) measurement information of the neighboring base station 410's signal strength, 2) transmit power, 3) unique scrambling code, and 4) radio link configuration. Base station 450 may also send separately to base station 410, the sequence of symbols or bits of the wireless device 460*a* causing interference at neighboring base station 410. This may be done when the base station 450 knows that the wireless device 460*a* may cause interference to base station 410 but the signal from wireless device 460*a* at base station 410 will be too weak to be successfully demodulated.

Figure 8:
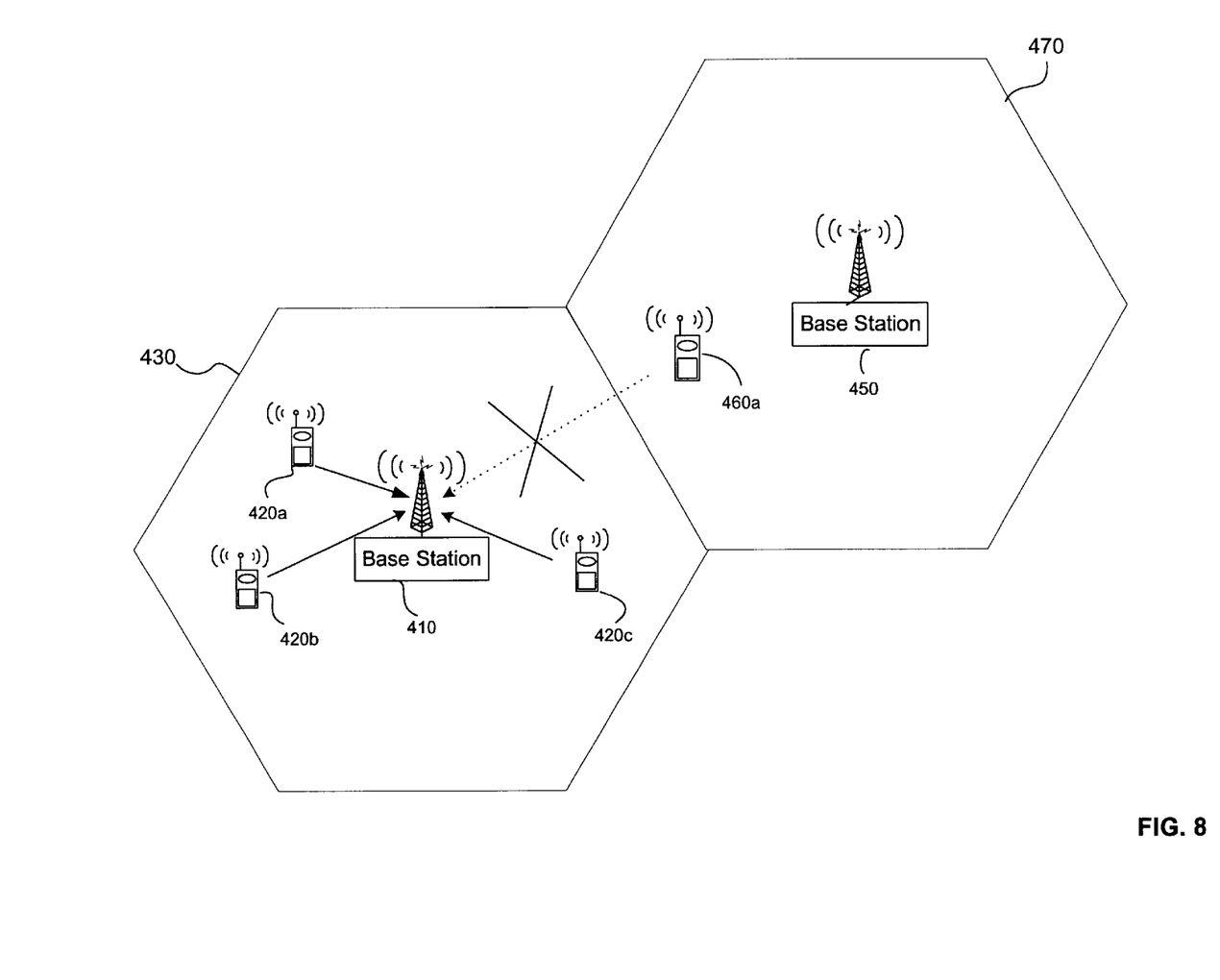

Referring now to FIG. 8, upon receiving information about a potentially interfering signal from base station 450, base station 410 may then further evaluate the information before canceling the interfering signal based on the wireless device 460*a* interference impact, loading in base stations 450 and 410 (e.g., the number of available carriers), desired capacity at base station 410, wireless device 460*a* processing burden, and processing power availability at base station 410. The measurement information is then used to determine if base station 410 will demodulate and cancel the interfering signal from wireless device 460*a* using a multi-user detection ("MUD") algorithm. The MUD algorithm will be discussed in further detail with reference to FIG. 9C below.

Figure 9A:
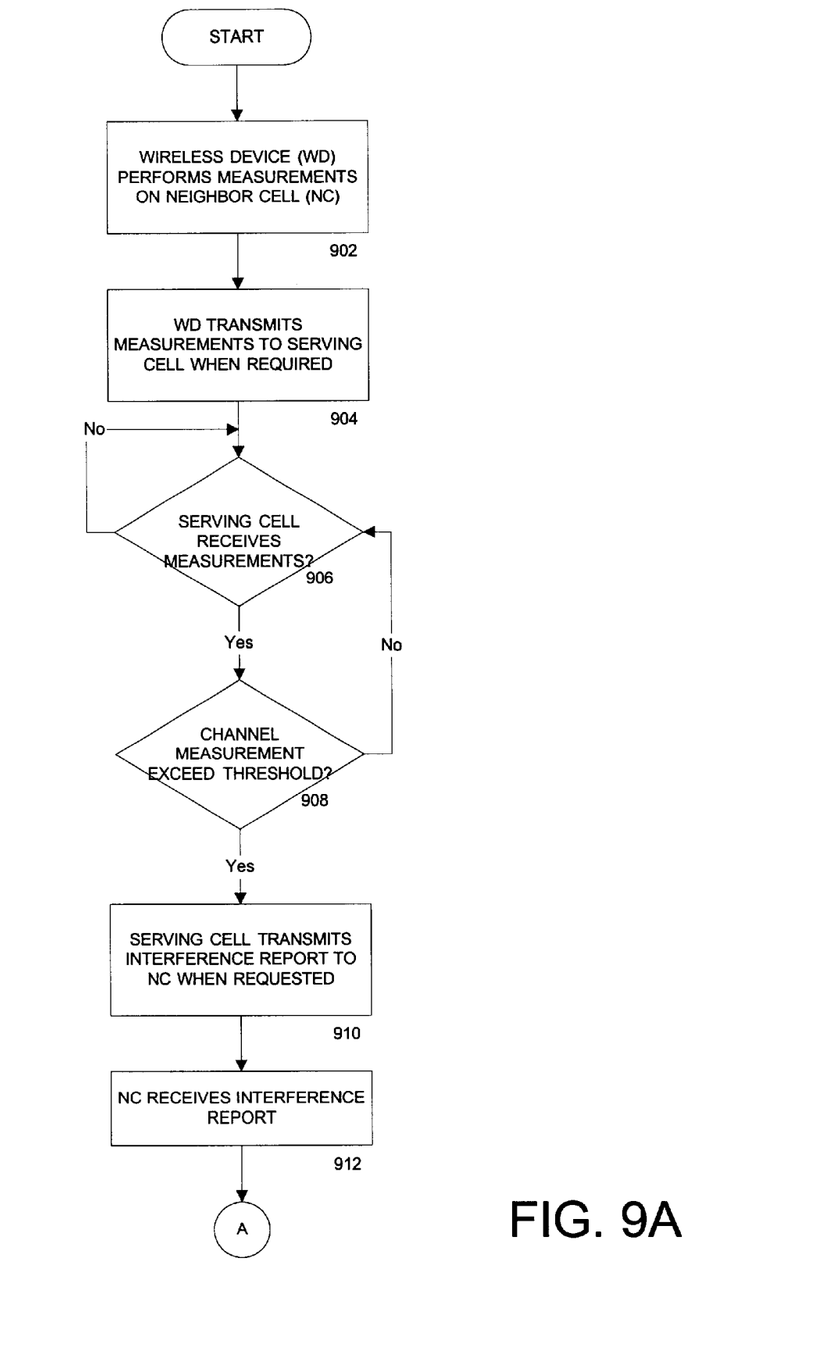
FIG. 9A illustrates a flow chart of the steps performed for canceling interference across cells in accordance with methods and systems consistent with the present invention.
Figure 9B:
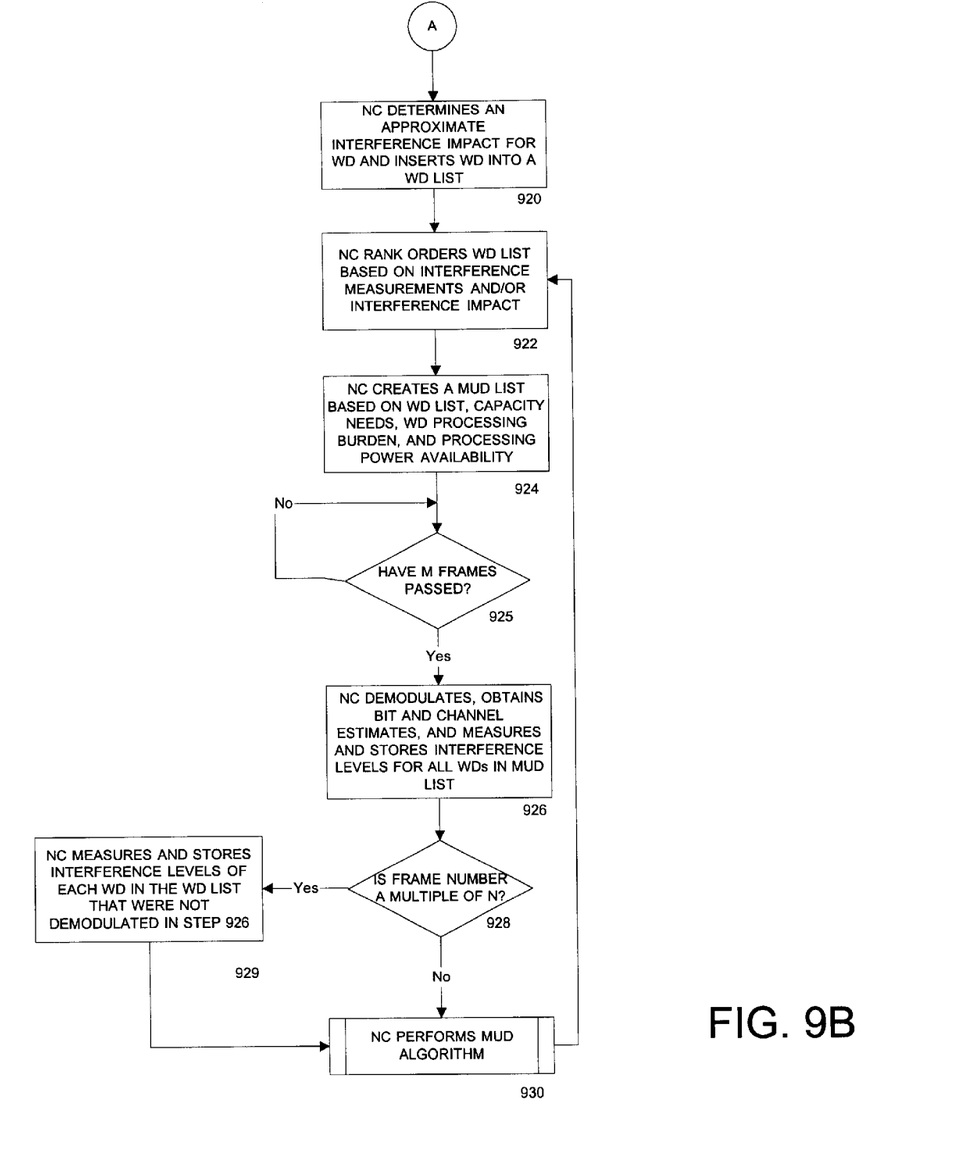
FIG. 9B illustrates a flow chart of the steps performed for canceling interference across cells in accordance with methods and systems consistent with the present invention.
Figure 9C:
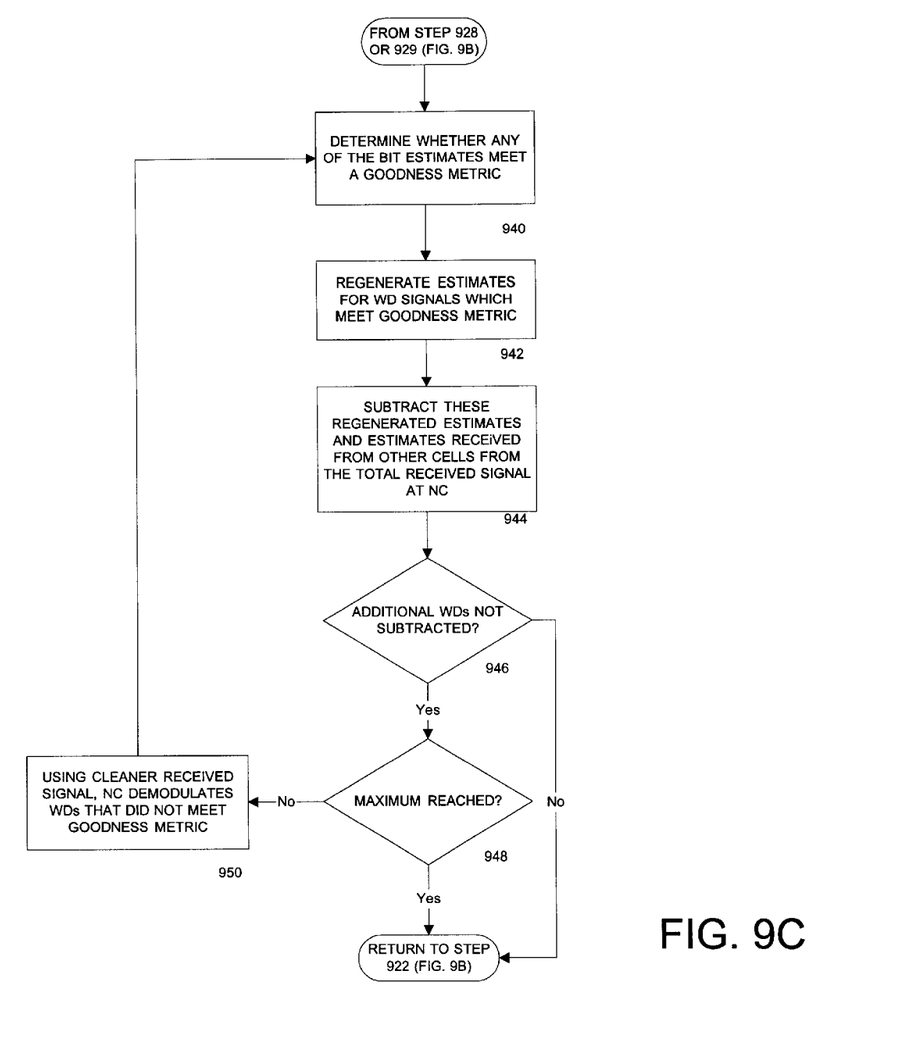
FIG. 9C illustrates a flow chart of the steps performed for canceling interference across cells in accordance with methods and systems consistent with the present invention.

FIGS. 9A, 9B, and 9C illustrate an exemplary method for canceling a communication from a single wireless device, in accordance with an embodiment of the invention. While the method describes a simple example involving only one wireless device, its serving base station, and its neighboring base station, this exemplary method is applicable to any number of wireless devices, base stations, and sectors per cell.

Referring now to FIG. 9A, a wireless device, such as wireless device 460*a*, first performs downlink channel measurements on its serving base station 450 and neighboring base station 410 (Step 902). The neighboring base station information is available in a neighbor list broadcasted by the wireless communication network and made available to wireless devices through their respective serving base stations. After performing its measurements, wireless device 460*a* transmits the measurement information to its serving base station 450 (Step 904). As described above, the serving base station 450 may use measurement control messages to specify transmission of measurement information based on particular measurement reporting criteria. For example, the measurement reporting criteria may specify periodic reporting, event triggered reporting, or a combination of both periodic and event triggered reporting. Alternatively, measurement information may be transmitted only upon request. Accordingly, serving base station 450 may request measurements from wireless device 460a. In that case, wireless device 460a performs measurements on neighboring base stations and transmits the information to serving base station 450.

Upon receiving measurements from wireless device 460a, serving base station 450 assesses the potential interference caused by wireless device 460a on neighboring base station 410 by determining whether the signal strength measurement of base station 410 exceeds a predetermined strength threshold (Step 908). Alternatively, serving base station 450 assesses the potential interference caused by wireless device 460a on neighboring base station 410 based on a combination comprising both neighboring base station 410's signal strength measurement as well as wireless device 460a's data rate and location.

This threshold may vary in time, per data rate, and per base station. For example, neighboring base station 410 may determine that during a certain busy period, cancellation of interfering signals is not feasible due to the unavailability of processing power. Consequently, during such times serving base station 450 need not send measurement information to neighboring base station 410. To offer maximum flexibility and reserve resources, neighboring base station 410 may periodically send a strength threshold setting and report status to base station 450. The report status can take one of two values: no report or report based on a specified reporting period.

If the signal strength measurement is determined not to exceed the strength threshold or the neighboring base station 410 requested no report status, serving base station 450 awaits the next measurement report from wireless device 460a (Step 906). If, however, the signal strength measurement exceeds the predetermined threshold and the neighboring base station 410 requested reports based on a specified reporting period, serving base station 450 transmits, via the network connection 480, an interference report to neighboring base station 410 (Step 910), which is then received by neighboring base station 410 (Step 912). The interference report comprises following information for wireless device 460a: 1) measurement information of the neighboring base station 410's signal strength, 2) transmit power, 3) unique code, and 4) radio link configuration. Base station 450 may also send separately to base station 410 the sequence of symbols or bits of the interfering wireless device 460a to facilitate demodulation and cancellation of wireless device 460a by neighboring base station 410.

Referring now to FIG. 9B, upon receiving an interference report, neighboring base station 410 determines an approximate interference impact of wireless device 460a and inserts it into a Wireless Device ("WD") list (Step 920). The interference impact may be measured through interference level measurement or approximated through interference impact that may be calculated based on the path loss between the interfering wireless device 460a and the neighboring base station 410 and the wireless device 460a transmit power.

Neighboring base station 410 then ranks the order of the WD list based on the approximate interference impact and/or the measured interference level (Step 922). The WD list may already be populated with other wireless devices from cells adjacent to neighboring cell 410. Indeed, the WD list may already include wireless device 460a from a previous interference report. In that case, wireless device 460a is merely updated based on its new interference impact.

The WD list is further parsed and condensed into a Multi-User Detection ("MUD") list based on the ordered WD list, loading in base station 410 and its neighboring base stations (e.g., the number of available carriers), desired capacity at base station 410, individual wireless devices' processing burden, and the processing power available at base station 410 (Step 924). For example, if base station 410 is operating near full capacity, the MUD list will be more limited than if base station 410 is operating at partial capacity.

Every M frames (Step 925), neighboring base station 410 demodulates, determines bit and channel estimates, and measures and stores interference levels for all wireless devices in the MUD list (Step 926). A W-CDMA frame is 10 ms and M frames is normally set to a value no smaller than the transmission time interval over which a data block was coded and interleaved.

Other base stations may assist in demodulating and determining bit and channel estimates where one or more base stations are overloaded. Furthermore, base station 450 may also assist base station 410 in determining bit or symbol estimates of wireless device 460a when the interfering signal of wireless device 460a is too weak for successful demodulation by base station 410 by providing the actual sequence of bits or symbols from interfering wireless device 460a. Whether other base stations assist depends on the ability of the target base station to demodulate the communication with or without this additional information and the load and delay on the IP network. This decision may also depend on the performance gain resulting from sending these bits.

Every N frames (Step 928), neighboring base station 410 measures and stores the interference levels of each wireless device in the WD list that were not demodulated previously in step 926 (Step 929). In addition, based on the bit and channel estimates obtained at step 926, neighboring base station 410 performs the MUD algorithm (Step 930).

A major drawback of conventional MUD algorithms is the extensive processing power required to implement multi-user detection. For example, at each stage of the PIC MUD algorithm, K users are demodulated and bit and channel estimates are obtained for each of the K users. Then, each of the K bit estimates is scaled by the channel estimate and respread. All but one input signal at each of the outputs is then summed and subtracted from the total received signal to get a cleaner signal of each of the K users. The cleaner signals are finally fed back into the next stage of the conventional MUD algorithm.

FIG. 9C shows a flow diagram of a MUD algorithm, in accordance with an embodiment of the present invention. The MUD algorithm of an embodiment of the present invention reduces the processing power usage required by conventional algorithms in several ways. First, only the wireless devices included in the MUD list are demodulated. And as described above, the MUD list can shrink or grow depending on processing power availability. For example, processing power may be further reduced by using a modified PIC MUD algorithm. Instead of demodulating and reconstructing every user in the MUD LIST at every stage of the multi-user detection algorithm, a goodness metric such as error on cyclic redundancy check ("CRC") may be used to estimate and cancel users only once or to minimize how many times users are cancelled.

Referring now to FIG. 9C, neighboring base station 410 determines whether any of the bit estimates meet a goodness metric (Step 940). The goodness metric is used in the MUD algorithm to determine if the bit estimates of the interfering wireless devices should be reconstructed and canceled definitively from the total received signal or re-estimated in the next stage of the MUD algorithm. The goodness metric is also used to reduce the processing complexity involved in having to regenerate signals from all wireless devices at every stage of the algorithm. The goodness metric may be based on coding path differences and/or a CRC check, if decoding is performed before the MUD algorithm. Signals from wireless devices with no failure on a CRC would be cancelled directly and not regenerated for the next stage of the MUD algorithm thus reducing processing complexity of the algorithm.

If any of the bit estimates meet the goodness metric, neighboring base station 410 regenerates estimates for those wireless devices corresponding to the bit estimates (Step 942). Other base stations may also assist in regenerating estimates. In other words, serving base station 450 may send the symbol sequence of the interfering wireless device 460a directly to its neighboring base station 410 when that serving base station 450 detects that the neighboring base station 410 would not be able to demodulate this wireless device 460a. In some instances, the delay needed to receive these symbols may not be worth the increase in performance, and therefore, the serving base station 450 may decide not to send these symbol estimates.

Once the estimates are regenerated and/or received, they are then subtracted from the signal received by neighboring base station 410 (Step 944). Neighboring base station 410 then determines whether any additional wireless device signals remain to be subtracted (Step 946). If so, neighboring base station 410 determines whether the maximum number of stages in the MUD algorithm has been reached (Step 948). The maximum number of stages depends on the availability of processing power as well as the performance gain. An extra stage may be added to the multi-user detector if the performance gain obtained from the new stage is significant. If the maximum number of stages have not been reached, neighboring base station 410 may attempt to demodulate the wireless devices that did not meet the goodness metric in step 940 (Step 950). If, on the other hand, the maximum number of stages is reached, neighboring base station 410 returns to step 922.

While it has been illustrated and described what is at present considered to be the preferred embodiments and methods of the present invention, it will be understood by those skilled in the art that various changes and modifications may be made, and equivalents may be substituted for elements thereof without departing from the true scope of the invention. Therefore it is intended that the invention not be limited to the particular embodiments and methods disclosed herein, but the invention includes all embodiments falling within the scope of the appended claims.

What is claimed is:

1. A method for reducing interference in a wireless communication system comprising the steps of:

receiving, at a first cell, measurement information from a first and a second wireless device served by the first cell while the first and second wireless devices are at the first cell;

determining that the first and second wireless devices cause interference at a second cell serving wireless devices other than the first and second wireless devices, based on the measurement information;

sending to the second cell information about the interference;

receiving the interference information at the second cell;

determining a signal based on the interference information; and subtracting the signal at the second cell to reduce the interference, the subtracting step comprising the steps of:

determining an interference impact of the first and second wireless devices;

ranking the first and second wireless devices based on their respective impacts;

creating a list of wireless devices based on the interference impact of the first and second wireless devices; and subtracting the signals of the wireless devices on the list.

2. The method of claim 1, wherein the subtracting step comprises the steps of:

demodulating signals of the wireless devices on the list;

determining a bit estimate and a channel estimate for the demodulated signals of the wireless devices on the list; and determining that the signals of the wireless devices on the list meet a goodness metric.

3. The method of claim 2, wherein the step of determining a bit estimate is performed at the first cell and the bit estimate is transmitted from the first cell to the second cell when the signal is undetectable by the second cell.

4. The method of claim 2, wherein the step of determining a bit estimate is performed at the first cell when the signal is undetectable by the second cell.

5. The method of claim 2, wherein only the signals of the wireless devices on the list meeting the goodness metric are subtracted.

6. The method of claim 2, wherein the goodness metric includes a coding path difference.

7. The method of claim 2, wherein the goodness metric includes a CRC error check.

8. The method of claim 1, wherein the step of creating a list of wireless devices is further based on processing burden of the first and second wireless devices, loading in the first and second cells, desired capacity at the second cell, and processing power availability at the second cell.

9. The method of claim 1, wherein said step of determining an interference impact comprises determining an approximate interference impact of the first and second wireless devices.

10. The method of claim 1, wherein said step of determining an interference impact comprises determining a measured interference level of the first and second wireless devices.

11. A method for reducing interference between wireless devices, in a system comprising a plurality of wireless devices including a first wireless device, a plurality of cells including a first cell and a second cell, and a packet network, wherein the first cell receives measurement information from the first wireless device, determines that the first wireless device causes interference at the second cell, and transmits information about the interference to the second cell through the packet network, and wherein the second cell receives the interference information from the first cell and cancels the interference by the first wireless device based on the interference information, the method comprising;

the step of creating a list of wireless devices based on the interference impact of the plurality of wireless devices, loading at the first and second cells, desired capacity at the second cell, processing burden of the plurality of wireless devices, and processing power availability at the second cell.

12. The method of claim 11, further comprising the step of only demodulating the wireless devices on the list.

* * * * *